US010901855B2

(12) United States Patent
Jarvie et al.

(10) Patent No.: US 10,901,855 B2
(45) Date of Patent: Jan. 26, 2021

(54) ON-DEMAND MULTITENANT DATA BACKUP AND RESTORE

(71) Applicant: International Business Machines Corporation, Armonk, NY (US)

(72) Inventors: Rachel L. Jarvie, Durham, NC (US); Qingyan Wang, Sudbury, MA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 16/014,773

(22) Filed: Jun. 21, 2018

(65) Prior Publication Data

US 2019/0391879 A1    Dec. 26, 2019

(51) Int. Cl.
*G06F 11/14* (2006.01)
*G06F 16/28* (2019.01)
*G06F 16/23* (2019.01)

(52) U.S. Cl.
CPC ...... *G06F 11/1451* (2013.01); *G06F 16/2329* (2019.01); *G06F 16/2358* (2019.01); *G06F 16/2379* (2019.01); *G06F 16/283* (2019.01); *G06F 16/284* (2019.01); *G06F 2201/80* (2013.01); *G06F 2201/805* (2013.01); *G06F 2201/82* (2013.01)

(58) Field of Classification Search
CPC ............. G06F 11/1451; G06F 16/2329; G06F 16/2379; G06F 16/284; G06F 16/2358; G06F 16/283; G06F 2201/80; G06F 2201/805; G06F 2201/82
USPC ........................................................ 707/744
See application file for complete search history.

(56) References Cited

U.S. PATENT DOCUMENTS

| 7,657,582 | B1 | 2/2010 | Cram et al. |
| 9,075,788 | B1* | 7/2015 | Roth .................... G06F 11/3006 |
| 9,075,839 | B2* | 7/2015 | Feng .................... G06F 11/1446 |
| 9,292,573 | B2 | 3/2016 | Walker et al. |
| 9,626,291 | B2 | 4/2017 | Schreter |
| 10,372,555 | B1* | 8/2019 | Troyan ................ G06F 11/1469 |
| 10,592,475 | B1* | 3/2020 | Ghidireac ............. G06F 16/182 |

(Continued)

OTHER PUBLICATIONS

Rjaibi, W.; "Data Security Best Practices—A practical guide to implementing row and column access control"; IBM Corporation, Apr. 2012.

(Continued)

*Primary Examiner* — Evan Aspinwall
(74) *Attorney, Agent, or Firm* — Steven Bouknight; Edell, Shapiro & Finnan, LLC

(57) ABSTRACT

Methods, systems, and computer program products are provided. Tenant data of a multitenant relational database system is backed up by adding a value of a current version identifier for the tenant data to previous valid version identifiers for the tenant data, and changing the value of the current version identifier for the tenant data to a next previously-unused value. The tenant data is restored by changing the value of the current version identifier to a value of one of the previous valid version identifiers, and deleting, from the previous valid version identifiers, previous valid version identifiers that are not less recent than the changed value of the current version identifier. The tenant is provided with a view of the tenant data included in only a latest valid version of each respective record from among all valid versions of the each respective record.

20 Claims, 5 Drawing Sheets

(56) References Cited

U.S. PATENT DOCUMENTS

| | | |
|---|---|---|
| 2005/0216520 A1 | 9/2005 | He et al. |
| 2010/0223430 A1* | 9/2010 | Walker .............. G06F 16/24552 711/126 |
| 2016/0070717 A1* | 3/2016 | Bergner ................ G06F 16/178 707/638 |
| 2017/0116334 A1* | 4/2017 | Kruglikov ............. G06F 16/951 |
| 2018/0189369 A1* | 7/2018 | Baek ................... G06F 16/2358 |
| 2018/0210727 A1* | 7/2018 | Elliott ................. G06F 21/6227 |
| 2018/0322156 A1* | 11/2018 | Lee ..................... G06F 16/2343 |
| 2018/0373604 A1* | 12/2018 | Martin ................ G06F 11/1451 |
| 2019/0163459 A1* | 5/2019 | Sreenivasa ................ G06F 8/71 |
| 2019/0235852 A1* | 8/2019 | Bartolotta ................ G06F 8/65 |

OTHER PUBLICATIONS

IBM; "User of Control Statements to Determine Record Layouts for Use in Generic Tools for Loading, Updating or Restoring IMS Database Records"; http://ip.com/IPCOM/000125943D; Jun. 23, 2005.

Anonymously; "Method and System for Managing a Plurality of Applications Using Multiple Version Views of Database Records"; http://ip.com/IPCOM/000218136D; May 23, 2012.

Anonymously; "A Method of Versioning Database Records to Allow Co-existence of Data During Migration"; http://ip.com/IPCOM/000206359D; Apr. 19, 2011.

* cited by examiner

| KEY | VALUE | VERSION | DELETED |
|---|---|---|---|
| 123 | A | 0 | FALSE |
| 124 | B | 0 | FALSE |

FIG.4

| KEY | VALUE | VERSION | DELETED |
|---|---|---|---|
| 123 | A | 0 | FALSE |
| 123 | A' | 1 | FALSE |
| 124 | B | 0 | FALSE |
| 124 | B | 1 | TRUE |
| 456 | C' | 1 | FALSE |

FIG.5

| KEY | VALUE | VERSION | DELETED |
|---|---|---|---|
| 123 | A" | 0 | FALSE |
| 123 | A' | 1 | FALSE |
| 124 | B" | 0 | FALSE |
| 124 | B | 1 | TRUE |
| 456 | C' | 1 | FALSE |
| 125 | D | 0 | FALSE |

FIG.6

| KEY | VALUE | VERSION | DELETED |
|---|---|---|---|
| 123 | A" | 0 | FALSE |
| 123 | A" | 3 | TRUE |
| 123 | A' | 1 | FALSE |
| 124 | B" | 0 | FALSE |
| 124 | B'" | 4 | FALSE |
| 124 | B"" | 5 | FALSE |
| 124 | B | 1 | TRUE |
| 456 | C' | 1 | FALSE |
| 125 | D | 0 | FALSE |
| 126 | X | 3 | FALSE |
| 126 | X' | 4 | FALSE |
| 136 | Y | 5 | FALSE |

FIG.7

ON-DEMAND MULTITENANT DATA BACKUP AND RESTORE

BACKGROUND

1. Technical Field

Present invention embodiments relate to a computer system, a method and a computer program product for providing on-demand backup and restore operations to tenants of a multitenant database system.

2. Discussion of the Related Art

Multitenant data in a multitenant relational database system may be isolated using separate databases, a shared database with separate schemas, or a shared schema, also known as a shared table. When using a shared schema, data isolation is implemented through a Tenant-ID field. For example, data view or finer control security can be applied through the Tenant-ID field. Each tenant can see and operate only on their own set of data within a table.

In a multitenant relational database system, backup and restore of tenant data is challenging, especially when the multitenant relational database system uses a shared schema. Traditionally, a backup and restore operation is performed on an entire database according to a schedule defined by a service provider. Selection is used when restoring only a tenant's data resulting in a large amount of overhead that impacts other tenants using the database. Further, if the service provider, and not the tenant, initiates the restore, the restore operation is not an on-demand operation.

It may be possible for a tenant to initiate a restore, but such an implementation could require another layer of security and possibly cause an interruption to the tenant's ability to continue working in the system as well as be disruptive to other tenants. Other methods for backing up and restoring tenant data have high central processing unit (CPU) overhead and input/output overhead due to selection of only specific rows.

One existing multitenant database system logs tenants' requests to a database and performs a restore of tenant data based on the log. However, restoring of the tenant data to the database has high overhead and could require a significant amount of time. Another existing multitenant database system supports restoring of a deleted row of tenant data by keeping and marking the deleted row. However, this system does not provide an on-demand backup and restore capability.

SUMMARY

According to an aspect of embodiments of the invention, a computer-implemented method is provided for backing up and restoring data on-demand in a multitenant relational database system. Data of a tenant of the multitenant relational database system is backed up by: adding a value of a current version identifier for the tenant data to a list of previous valid version identifiers for the tenant data, and changing the value of the current version identifier for the tenant data to a next previously-unused version identifier value. The tenant data in the multitenant relational database system is restored by changing the value of the current version identifier for the tenant data to a value of one of the previous valid version identifiers for the tenant data, and deleting, from the previous valid version identifiers for the tenant data, previous valid version identifiers that are not less recent than the changed value of the current version identifier. A view of only the tenant data that is included in a latest valid version of each respective record from among all valid versions of the each respective record is provided to the tenant.

According to another aspect of embodiment of the invention, a computer system that includes a multitenant relational database system may be provided. The computer system may include at least one processor and a memory connected to the at least one processor. The memory includes instructions for the at least one processor to be configured to perform a number of operations. Data of a tenant of the multitenant relational database system is backed up by adding a value of a current version identifier for the tenant data to a list of previous valid version identifiers for the tenant data, and changing the value of the current version identifier for the tenant data to a next previously-unused version identifier value. The tenant data in the multitenant relational database is restored by changing the value of the current version identifier for the tenant data to a value of one of the previous valid version identifiers for the tenant data, and deleting, from the previous valid version identifiers for the tenant data ones of the previous valid version identifiers that are not less recent than the changed value of the current version identifier. The tenant is provided with a view of the tenant data that includes only a latest valid version of each respective record from among all versions of the each respective record.

According to yet another aspect of embodiments of the invention, a computer program product that includes at least one computer readable storage medium may be provided. The at least one computer readable storage medium has computer readable program code embodied therewith for execution on at least one processor. The computer readable program code is configured to be executed by the at least one processor to perform a number of operations. Data of a tenant of a multitenant relational database system is backed up by adding a value of a current version identifier for the tenant data to a list of previous valid version identifiers for the tenant data, and changing the value of the current version identifier for the tenant data to a next previously-unused version identifier value. The tenant data in the multitenant relational database system is restored by changing the value of the current version identifier for the tenant data to a value of one of the previous valid version identifiers for the tenant, and deleting, from the previous valid version identifiers for the tenant data, ones of the previous valid version identifiers that are not less recent than the changed value of the current version identifier. The tenant is provided with a view of the tenant data that includes only a latest valid version of each respective record from among all versions of the each respective record.

BRIEF DESCRIPTION OF THE DRAWINGS

Generally, like reference numerals in the various figures are utilized to designate like components.

FIGS. 4-7 show contents of a database with respect to an example of database operations performed according to embodiments of the invention.

DETAILED DESCRIPTION

In various embodiments, a computer system, a method, and a computer program product are provided such that a tenant of a multitenant relational database system can initiate a backup operation and a restore operation of tenant data. When tenant data is modified after a backup operation, a new version of an existing record is created. Fine access control such as row and column access control as used in, for example, DB2, which is a relational database management system available from International Business Machines headquartered in Armonk N.Y., or such as fine grain access control as used in, for example, Oracle® (Oracle is a registered trademark of Oracle International Corporation, headquartered in Redwood City, Calif.), which is a relational database management system available from Oracle International Corporation, may be used to control access to tenant data based on, for example, a tenant-ID. When a restore operation of tenant data is requested, a policy of a security permission control or a where clause of a view may permit a tenant to view and access an older valid version of tenant data.

Figure 1:
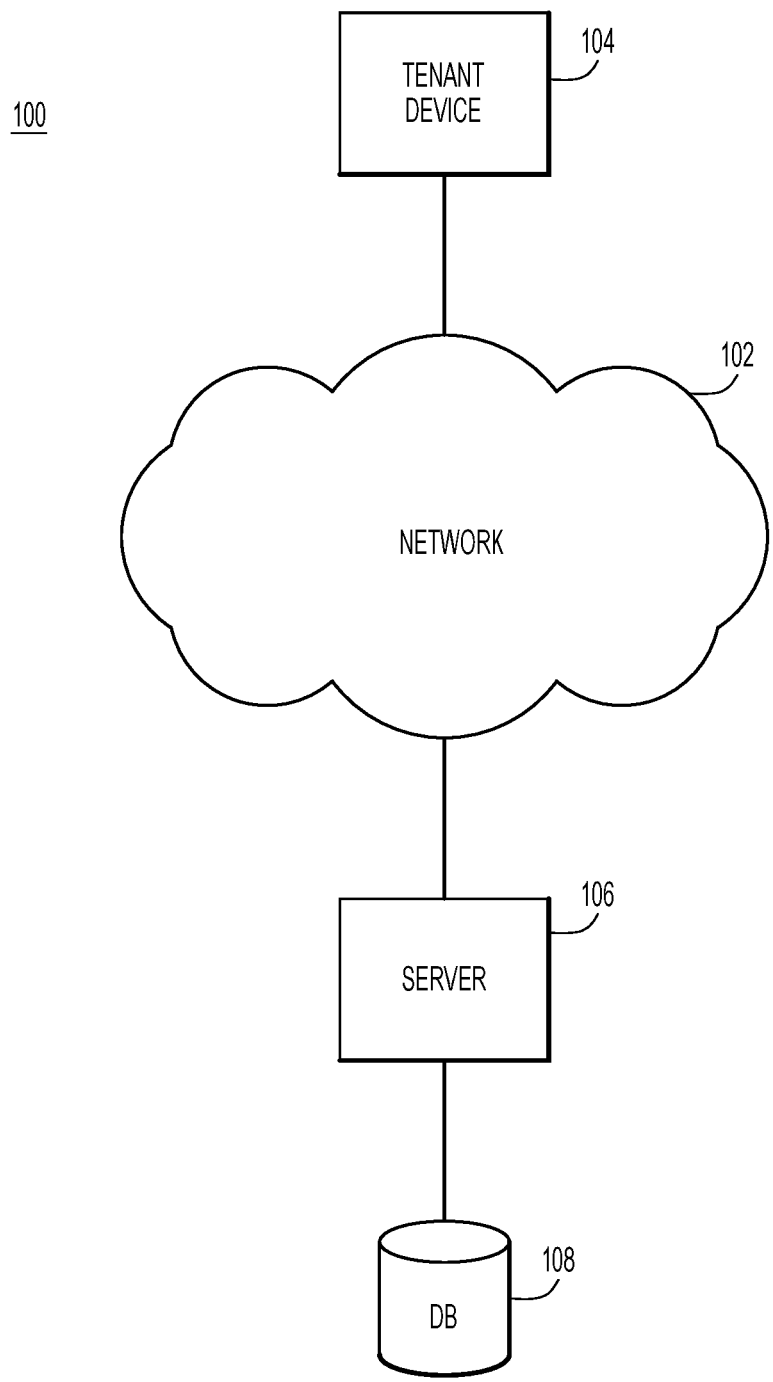
FIG. 1 illustrates an example environment in which embodiments of the invention may operate.

FIG. 1 illustrates an example environment 100 in which embodiments of the invention may operate. Example environment 100 may include a network 102 to which are connected, via a wired or a wireless connection, a tenant device 104 and a server 106. Tenant device 104 may include, but not be limited to, a smartphone, a tablet computer, a laptop computer or a notebook computer, a desktop computer, a mainframe computer, or other type of computer. Tenant device 104 may communicate with server 106 via network 102. Server 106 may include, but not be limited to, a desktop computer, a laptop computer, a mainframe computer, or other type of computer or may include a number of computers configured as a server farm. Server 106 may have direct access to a relational multitenant database 108 or, alternatively, may have remote access to relational multitenant database 108 via network 102.

Network 102 may be implemented by any number of any suitable communications media (e.g., wide area network (WAN), local area network (LAN), Internet, Intranet, etc.) or a combination of any of the suitable communications media. Network 102 may further include wired and/or wireless networks.

Figure 2:
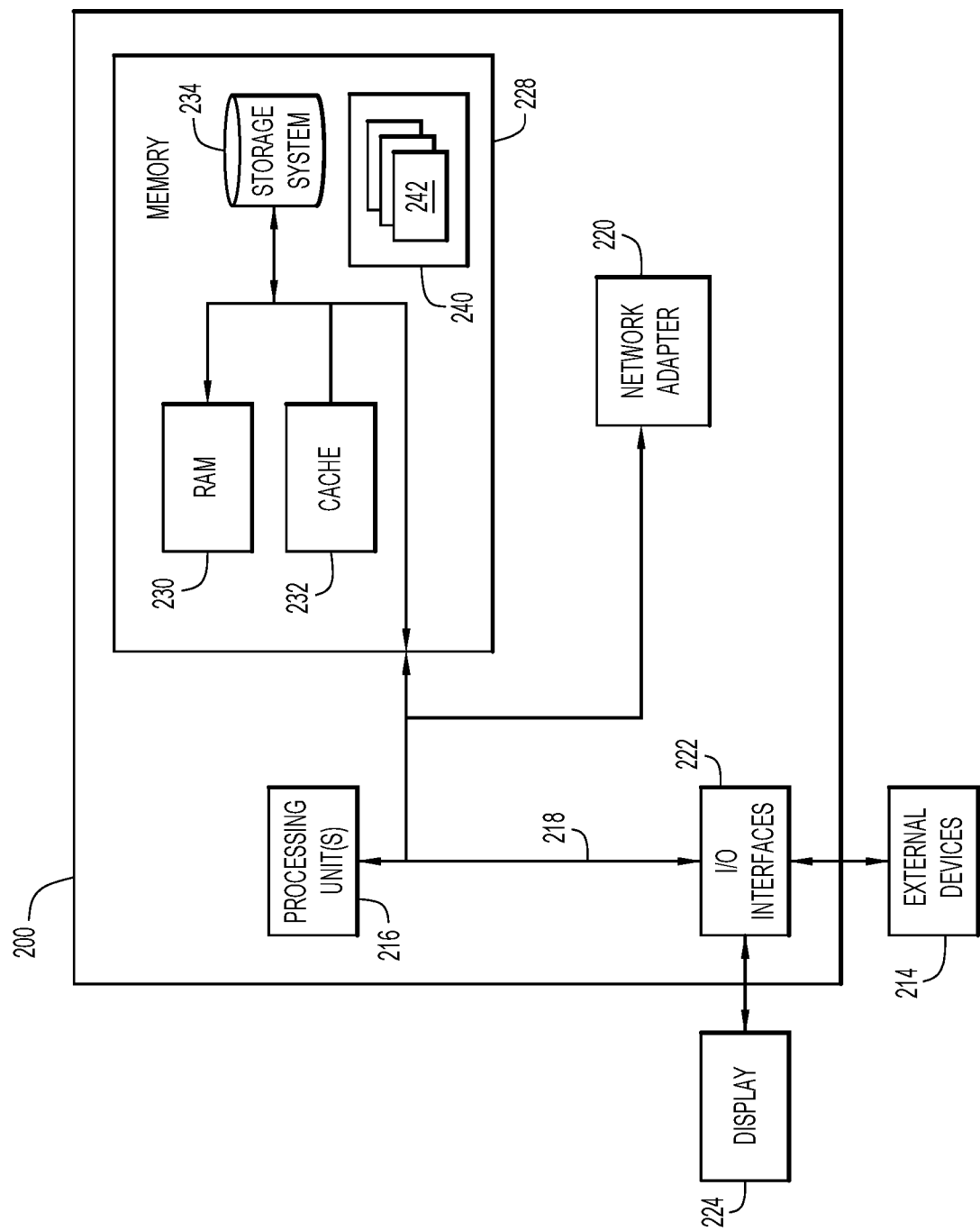
FIG. 2 is a functional block diagram of a computer system that may implement a tenant device or a server according to embodiments of the invention.

Referring now to FIG. 2, a schematic of an example computer system 200 is shown. Computer system 200 may implement tenant device 104 or server 106. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: microcode, device drivers, redundant processing units, external disk drive arrays, RAID systems, tape drives, and data archival storage systems, etc.

In various embodiments of the invention, each record of the multitenant relational database may be associated with a version identifier, which identifies a version of the record for a tenant, a tenant-ID, which identifies the tenant associated with the record, and a delete flag, which indicates whether the record is deleted in an active dataset. Further, the multitenant relational database management system may keep track, on a per tenant basis, of a current version identifier, which initially may be set to zero according to some embodiments, and a version history, which includes all previous valid version identifier values.

A set of rules to which a multitenant relational database management system may adhere may be implemented via a trigger mechanism, a stored procedure, or application code (if data access is totally encapsulated). The rules may include:

Rule 1. When a new record is inserted into a database, a version identifier associated with the record is set to a value of a current version identifier.

Rule 2. If a record is to be updated or deleted and the record is associated with a version identifier having a value that is not the value of the current version identifier, then a copy of the record may be inserted into the database and associated with a version identifier having the value of the current version identifier. The copy of the record may then be updated or deleted. A deleted record may have its associated delete flag set to true instead of actually being deleted.

Rule 3. If a record is to be deleted and the record is associated with a version identifier having the value of the current version identifier, a delete flag associated with the record may be marked as true. Alternatively, if the record did not exist in any previous valid versions, instead of marking the delete flag as true, the record actually may be deleted.

Rule 4. When a new record is added to the database, the new record has a new key that may have a value of a database sequence number, which may be incremented after each new record is added to the database. However, when adding a copy of an existing record under rule 2, a key of the added copy may be overwritten to have a value of a key of the existing record.

Figure 3:
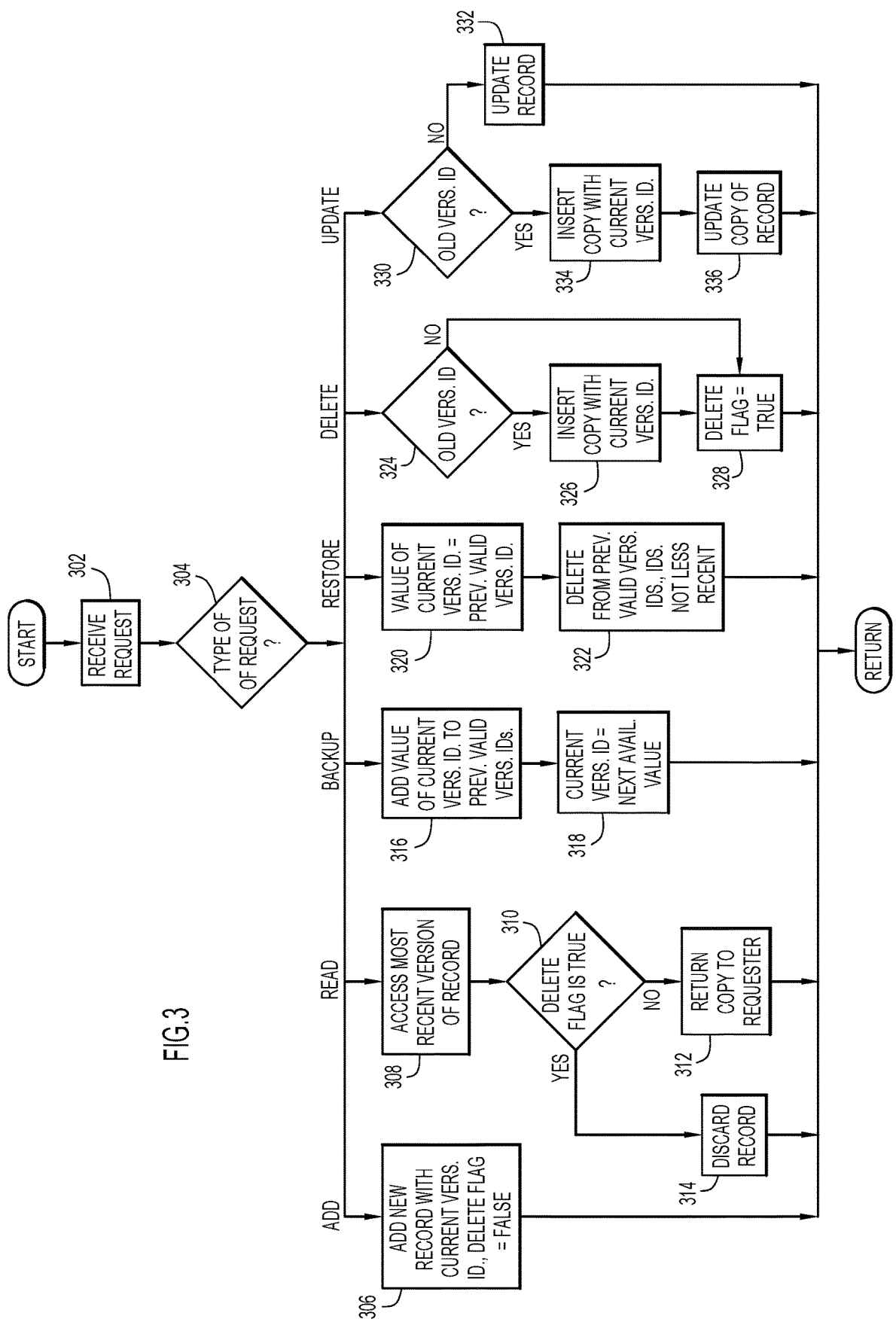
FIG. 3 is a flowchart of an example process that may be performed to implement operations with respect to a multitenant relational database system according to embodiments of the invention.

FIG. 3 is a flowchart that illustrates example processing, with respect to a tenant, according to embodiments of the invention. The process may begin with server 106 receiving a request from a tenant device 104 via network 102 (act 302). Server 106 may then determine a type of the received request (act 304).

If the request is determined to be a request to add a new record to a multitenant relational database, then the new record may be inserted into the database with a new key, may have an associated version identifier with a value of the current version identifier, and a delete flag set to false (act 306). The process may then be completed.

If the request is determined to be a read request to read a record of the database, then, using a security permission, server 106 may access a version of the record associated with a version identifier having a most recent value from among all valid versions of the record (act 308). If a delete flag associated with the record is determined to be true (act 310), indicating that the record is deleted, then the record may be discarded (act 314) and a response may be provided to tenant device 104 indicating that the record is deleted. If, during act 310, the delete flag is determined not to be true, then a copy of the record may be returned to tenant device 104 (act 312). The process may then be completed.

If, during act 304, the type of request is determined to be an on-demand backup request, then the value of the current version identifier may be added to a version history, which may include values of previous valid version identifiers (act 316). The current version identifier may then be set to a next available value (act 318). The process may then be completed. Note that because tenant data for previous valid versions of the records may already be stored in the database, actual saving of tenant data in response to the on-demand backup request is not needed. This can be seen in more detail with respect to the examples provided later in this specification.

If, during act 304, the type of request is determined to be an on-demand restore request, then the value of the current version identifier may be set to a value of a previous valid version identifier (act 320). The value of the previous valid version identifier may be a value of an immediately preceding previous valid version identifier or may be a value of any other previous valid version identifier. Server 106 may then delete, from the previous valid version identifiers, all values of previous valid version identifiers that are not less recent than the value of the current version identifier (act 322). The process may then be completed. Note that because the previous valid versions of the tenant data are already stored in the database, actual restoring of tenant data is not needed. This can be seen in more detail with respect to the examples provided later in this specification.

If, during act 304, the type of request is determined to be a request to delete a record of the database, then the record may be accessed according to the security permission and a value of a version identifier associated with the record may be checked to determine whether the associated version identifier has a value that is less recent than the value of the current version identifier (act 324). If the value of the version identifier is determined to be less recent than the value of the current version identifier, then a copy of the record may be inserted into the database, an associated version identifier may be set to the value of the current version identifier, and the key of the copy of the record may be overwritten with a value of the key of the record that was copied (act 326). A delete flag of the copy of the record may then be set to true to indicate that the copy of the record is deleted (act 328). The process may then be completed. However, if, during act 324, the value of the associated version identifier of the record to be deleted is determined to have the value of the current version identifier, then the delete flag may be set to true to indicate deletion of the record (act 328). The process may then be completed. Alternatively, when the value of the version identifier of the record to be deleted is the value of the current version identifier and no previous versions of the record exist, then the record may actually be deleted from the database.

If, during act 304, the type of request is determined to be a request to update a record, then server 106 may determine whether a version identifier associated with the record to be updated has a less recent value than the value of the current version identifier (act 330). If the value of the associated version identifier is determined not to be less recent than the value of the current version identifier, then the value of the associated version identifier has the value of the current version identifier and server 106 may then update the record by writing updated data to the record to be updated (act 332). The process may then be completed. However, if the value of the version identifier associated with the record to be updated is less recent than the value of the current version identifier, then server 106 may insert a copy of the record to be updated into the database with an associated version identifier having the value of the current version identifier and a key of the inserted copy of the record may be overwritten with a value of the key of the record that was copied. The copy of the record then may be updated by writing updated tenant data to the copy of the record (act 336). The process may then be completed.

Following are examples that illustrate operations according to embodiments of the invention. Initially, a current version identifier may be set to 0. FIG. 4 illustrates example content for a tenant of a multitenant relational database. In this example, the database includes two tenant data records, both of which have a version identifier of 0. A first tenant data record has a key with a value of 123 and data with a value of A. A second tenant data record has a key with a value of 124 and data with a value of B.

Server 106 receives a backup request from a tenant device and initiates a backup operation for the tenant data. As a result, the value of the current version identifier, 0, may be added to previous valid version identifiers, which is a version history, and the current version identifier is assigned a next available value, which in this example is 1. The record 123 then is updated, thereby causing a copy of the record 123 to be created and stored in the database with a version identifier of 1, the key 123 and updated data having a value of A'. Note that the previous version of the record remains unchanged in the database. The record 124 then is deleted, thereby causing a copy of the record 124 to be created with a version identifier of 1, the key 124, and a delete flag of true. The previous version of the deleted record remains unchanged in the database. Then, a new record with a key of 456 is created with a value of C and a version identifier set to the value of the current version identifier, which is 1. The record 456 then may be updated to have a value of C'. Because the record 456 has a version identifier with the value of the current version identifier, the record 456 may be updated by simply writing the value C' to the record.

FIG. 5 shows content of the database after the above-mentioned operations. Based on a security permission, only the most recent valid version of each version of the record may be viewed by the tenant if the record has not been deleted. Records that are not the most recent valid version of the record are hidden from the tenant. Therefore, the tenant will only be able to see: record 123, version 1, having tenant data with a value of A'; and record 456, version 1, having tenant data with a value of C'. Record 124 is considered to be deleted because the most recent version of record 124, which is version 1, has a delete flag set to true. The remaining tenant records are hidden from the tenant.

At this point, assume that server 106 receives a restore request from the tenant device. As a result of the restore operation, in this example, the value of the current version identifier is reverted back to 0. Based on the security permission, the user will only be able to see: record 123, version 0, having tenant data with a value of A; and record 124, version 0, having tenant data with a value of B. The remaining tenant records are hidden from the tenant. The previous valid version identifiers will not include 1.

Assuming that the tenant continues to work, then the content of the database may become as shown in FIG. 6. As shown, the record 123 has been updated to have a value A", the record 124 has been updated to a value of B", and new record 125 with a value of D has been added. Records 123 and 124 may have their respective tenant data updated by writing to records 123, version 0; and record 124, version 0 because version 0 has the value of the current version identifier. Based on the security permission and the value of the current version identifier, 0, the tenant only may be able to see latest valid versions of the record that have not been deleted. Version 1 is not a valid version identifier. Thus the tenant will only be able to see: record 123, version 0, having tenant data with a value of A"; record 124, version 0, having tenant data with a value of B"; and record 125, version 0, having tenant data with a value of D.

Now assume that several more backup requests were received and processed. For example, assume four more backup requests were processed and version identifiers 2, 3, 4 and 5 were generated. The current version identifier is 5 and the previous valid version identifiers are 0, 2, 3 and 4. Version identifier 1 is not one of the previous valid version identifiers. FIG. 7 shows current contents of the database. Based on the security permission, the tenant only will be able to see: record 124, version 5, having tenant data with a value of B""; record 125, version 0, which is the most recent valid version of record 125, having tenant data with a value of D; record 126, version 4, which is the most recent valid version of record 126, having tenant data with a value of X'; and record 136, version 5, having tenant data with a value of Y. The remaining records in the database may be hidden from the tenant.

At this point, a restore is requested to revert back to version 4. Therefore, the value of the current version identifier becomes 4 and 4 is deleted from the previous valid version identifiers, thereby making the previous valid version identifiers 0, 2 and 3. Version 5 is not a valid version identifier. Referring to FIG. 7, the tenant would only be able to see: record 124, version 4, having tenant data with a value of B'''; record 125, version 0, having tenant data with a value of D; and record 126, version 4, having tenant data with a value of X'.

In some embodiments, a purge operation may be performed on the database during a maintenance window to clean out old versions of records having more recent versions of the records stored in the database and invalid versions of records.

Embodiments of the invention provide a number of advantages. For example, when a backup or a restore operation is performed, no data transfer is performed and no additional CPU, memory, or input/output overhead is incurred. As a result, backup and restore operations have no impact to the database and do not affect other tenants of the relational multitenant database. Further, the backup and restore operations can be initiated by the tenant, and which tables are to be backed up can be controlled by the tenant by specifying the tables to back up in a backup request. In addition, backups can be performed according to a schedule or may be initiated by a tenant before the tenant performs a risky operation. A tenant initiated backup operation combined with a database backup operation performed by a system provider provide full database backup and restore operations to cover data corruption or data loss as well as an infrastructure problem that may occur with respect to the database.

It will be appreciated that the embodiments described above and illustrated in the drawings represent only a few of the many ways of implementing various embodiments of the invention.

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computer systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of backing up and restoring data on demand in a multitenant relational database system, the method comprising:
   in response to receiving from a tenant device a request to backup tenant data of a tenant of the multitenant relational database system performing:
      adding a value of a current version identifier associated with the tenant to a list of previous valid version identifiers associated with the tenant, each respective current version identifier and each respective list of previous valid version identifiers being associated with a respective tenant of a plurality of tenants, and
      changing the value of the current version identifier associated with the tenant to a next previously-unused version identifier value associated with the tenant; and
   in response to receiving from the tenant device a request to restore the tenant data of the tenant of the multitenant relational database system performing:
      changing the value of the current version identifier associated with the tenant to a value of one of the previous valid version identifiers associated with the tenant, and
      deleting, from the previous valid version identifiers associated with the tenant, ones of the previous valid version identifiers that are not less recent than the changed value of the current version identifier associated with the tenant resulting in the ones of the previous valid version identifiers that are more recent than the changed value of the current version identifier no longer being valid version identifiers for the tenant; and
   providing the tenant device with access to the tenant data included in only a latest valid version of each respective record from among all valid versions of the each respective record, wherein
   performing a backup of the tenant data of the tenant and performing a restore of the tenant data of the tenant affects only the tenant data accessible by the tenant without affecting accessibility of tenant data of other tenants by the other tenants.

2. The computer-implemented method of claim 1, further comprising:
   in response to receiving from the tenant device a request to access a record of the tenant data of the tenant of the multitenant relational database system, performing, by a computer:
      accessing a version of the record having a most recent valid version identifier from among all valid versions of the record for the tenant, and
      returning a copy of the version of the record to the tenant device; and
   when the accessed version of the record has a delete flag that indicates that the accessed version of the record is deleted, discarding the accessed version of the record.

3. The computer-implemented method of claim 1, further comprising:

in response to receiving a request from the tenant device to add a new record to the tenant data of the tenant of the multitenant relational database system, adding the new record to the tenant data of the tenant of the multitenant relational database system, the new record having a version identifier with the value of the current version identifier associated with the tenant and a delete flag indicating that the record is not deleted.

4. The computer-implemented method of claim 1, further comprising:
in response to receiving a request from the tenant device to delete a record of the tenant data of the tenant of the multitenant relational database system, performing:
when a version identifier of the record to be deleted has a value of one of the previous valid version identifiers associated with the tenant, performing:
inserting a copy of the record to be deleted with a version identifier having the value of the current version identifier associated with the tenant, and
setting a delete flag of the inserted copy of the record to indicate that the record is deleted.

5. The computer-implemented method of claim 4, further comprising:
when the version identifier of the record to be deleted has the value of the current version identifier and no earlier version of the record to be deleted exists, deleting the record.

6. The computer-implemented method of claim 4, further comprising:
when the version identifier of the record to be deleted has the value of the current version identifier, setting a delete flag of the record to indicate that the record is deleted.

7. The computer-implemented method of claim 1, further comprising:
in response to receiving a request from the tenant device to update a record of the tenant data of the tenant of the multitenant relational database system, performing:
when a version identifier of the record to be updated has the value of the current version identifier associated with the tenant, updating the record to be updated;
when the version identifier of the record to be updated has a value of one of the previous valid version identifiers associated with the tenant, performing:
inserting a copy of the record to be updated with a version identifier having the value of the current version identifier associated with the tenant, and
updating the copy of the record.

8. The computer-implemented method of claim 7, wherein:
when the version identifier of the record to be updated has the value of the one of the previous valid version identifiers, overwriting a key of the copy of the record with a value of a key of the record to be updated.

9. A computer system including a multitenant relational database system, the computer system comprising:
at least one processor; and
a memory connected to the at least one processor, the memory including instructions for the at least one processor to be configured to perform:
in response to receiving from a tenant device a request to backup tenant data of a tenant of the multitenant relational database system by:
adding a value of a current version identifier associated with the tenant to a list of previous valid version identifiers associated with the tenant, each respective current version identifier and each respective list of previous valid version identifiers being associated with a respective tenant of a plurality of tenants, and
changing the value of the current version identifier associated with the tenant to a next previously-unused version identifier value associated with the tenant; and
in response to receiving from the tenant device a request to restore the tenant data in the multitenant relational database system:
changing the value of the current version identifier associated with the tenant to a value of one of the previous valid version identifiers associated with the tenant, and
deleting, from the previous valid version identifiers for the tenant, ones of the previous valid version identifiers that are not less recent than the changed value of the current version identifier associated with the tenant resulting in the ones of the previous valid version identifiers that are more recent than the changed value of the current version identifier no longer being valid version identifiers for the tenant; and
providing the tenant device with access to the tenant data included in only a latest valid version of each respective record from among all valid versions of the each respective record, wherein
performing a backup of the tenant data of the tenant and performing a restore of the tenant data of the tenant affects only the tenant data accessible by the tenant without affecting accessibility of tenant data of other tenants by the other tenants.

10. The computer system of claim 9, wherein the at least one processor is further configured to perform:
in response to receiving from the tenant device a request to access a record of the tenant data of the tenant of the multitenant relational database system:
accessing a version of the record having a most recent valid version identifier from among all valid versions of the record for the tenant, and
returning a copy of the version of the record to the tenant device; and
when the accessed version of the record has a delete flag that indicates that the accessed version of the record is deleted, discarding the accessed version of the record.

11. The computer system of claim 9, wherein the at least one processor is further configured to perform:
in response to receiving a request from the tenant device to add a new record to the tenant data of the tenant of the multitenant relational database system, adding the new record to the tenant data of the tenant of the multitenant relational database system, the new record having a version identifier with a value of the current version identifier associated with the tenant and a delete flag indicating that the record is not deleted.

12. The computer system of claim 9, wherein the at least one processor is further configured to perform:
in response to receiving a request from the tenant device to delete a record of the tenant data of the tenant of the multitenant relational database system, performing:
when a version identifier of the record to be deleted has a value of one of the previous valid version identifiers associated with the tenant, performing:
inserting a copy of the record to be deleted with a version identifier having the value of the current version identifier associated with the tenant, and setting a delete flag of the inserted copy of the record to indicate that the record is deleted.

13. The computer system of claim 12, wherein the at least one processor is further configured to perform:
when the version identifier of the record to be deleted has the value of the current version identifier and no earlier version of the record to be deleted exists, deleting the record.

14. The computer system of claim 12, wherein the at least one processor is further configured to perform:
when the version identifier of the record to be deleted has the value of the current version identifier, setting a delete flag of the record to indicate that the record is deleted.

15. The computer system of claim 9, wherein the at least one processor is further configured to perform:
in response to receiving a request from the tenant device to update a record of the tenant data of the tenant of the multitenant relational database system, performing:
when a version identifier of the record to be updated has the value of the current version identifier associated with the tenant, updating the record to be updated;
when the version identifier of the record to be updated has a value of one of the previous valid version identifiers associated with the tenant:
inserting a copy of the record to be updated with a version identifier having the value of the current version identifier associated with the tenant,
overwriting a key of the copy of the record with a value of a key of the record to be updated, and updating the copy of the record.

16. A computer program product comprising at least one computer readable storage medium having computer readable program code embodied therewith for execution on at least one processor of a processing device, the computer readable program code being configured to be executed by the at least one processor to perform:
in response to receiving from a tenant device a request to backup tenant data of a tenant of a multitenant relational database system:
adding a value of a current version identifier associated with the tenant to a list of previous valid version identifiers associated with the tenant, and
changing the value of the current version identifier associated with the tenant to a next previously-unused version identifier value associated with the tenant; and
in response to receiving from the tenant device a request to restore the tenant data in the multitenant relational database system:
changing the value of the current version identifier associated with the tenant to a value of one of the previous valid version identifiers associated with the tenant, and
deleting, from the previous valid version identifiers for the tenant, ones of the previous valid version identifiers that are not less recent than the changed value of the current version identifier associated with the tenant resulting in the ones of the previous valid version identifiers that are more recent than the changed value of the current version identifier no longer being valid version identifiers for the tenant, and
providing the tenant device with access to the tenant data included in only a latest valid version of each respective record from among all valid versions of the each respective record, wherein
performing a backup of the tenant data of the tenant and performing a restore of the tenant data of the tenant affects only the tenant data accessible by the tenant without affecting accessibility of tenant data of other tenants by the other tenants.

17. The computer program product of claim 16, wherein the computer readable program code is further configured to be executed by the at least one processor to perform:
in response to receiving from the tenant device a request to access a record of the tenant data of the tenant of the multitenant relational database system:
accessing a version of the record having a most recent valid version identifier from among all valid versions of the record for the tenant, and
returning a copy of the version of the record to the tenant device; and
when the accessed version of the record has a delete flag that indicates that the accessed version of the record is deleted, discarding the accessed version of the record.

18. The computer program product of claim 16, wherein the computer readable program code is further configured to be executed by the at least one processor to perform:
in response to receiving a request from the tenant device to delete a record of the tenant data of the tenant of the multitenant relational database system:
when a version identifier of the record to be deleted has a value of one of the previous valid version identifiers associated with the tenant:
inserting a copy of the record to be deleted with a version identifier having a value of the current version identifier associated with the tenant,
overwriting a key of the copy of the record to be deleted with a value of a key of the record to be deleted, and
setting a delete flag of the inserted copy of the record to indicate that the record is deleted.

19. The computer program product of claim 16, wherein the computer readable program code is further configured to be executed by the at least one processor to perform:
in response to receiving a request from the tenant device to update a record of the tenant data of the tenant of the multitenant relational database system, performing:
when a version identifier of the record to be updated has the value of the current version identifier associated with the tenant, updating the record to be updated;
when the version identifier of the record to be updated has a value of one of the previous valid version identifiers associated with the tenant:
inserting a copy of the record to be updated with a version identifier having the value of the current version identifier associated with the tenant, and updating the copy of the record.

20. The computer program product of claim 19, wherein the computer readable program code is further configured to be executed by the at least one processor to perform:
when the version identifier of the record to be updated has the value of the one of the previous valid version identifiers, overwriting a key of the copy of the record with a value of a key of the record to be updated.

* * * * *